United States Patent
Grimbergen

(12) United States Patent (10) Patent No.: US 8,000,354 B2
(45) Date of Patent: Aug. 16, 2011

(54) METHOD AND APPARATUS FOR FORWARD DELAY COMPENSATION FOR VIRTUAL CONCATENATION

(75) Inventor: Stephanus Petrus Grimbergen, Leusden (NL)

(73) Assignee: Alcatel Lucent, Paris (FR)

( * ) Notice: Subject to any disclaimer, the term of this patent is extended or adjusted under 35 U.S.C. 154(b) by 1634 days.

(21) Appl. No.: 10/948,990

(22) Filed: Sep. 24, 2004

(65) Prior Publication Data

US 2006/0072540 A1    Apr. 6, 2006

(51) Int. Cl.
  *H04J 3/06*    (2006.01)
(52) U.S. Cl. ..................................... 370/519
(58) Field of Classification Search .............. 370/252, 370/253, 351, 412, 468, 503, 516, 517, 519, 370/536, 542, 543, 230, 235
  See application file for complete search history.

(56) References Cited

U.S. PATENT DOCUMENTS

| | | | |
|---|---|---|---|
| 4,759,017 A * | 7/1988 | Allan et al. | 370/438 |
| 5,432,790 A * | 7/1995 | Hluchyj et al. | 370/412 |
| 6,678,475 B1 * | 1/2004 | Turban et al. | 398/79 |
| 2001/0040902 A1 * | 11/2001 | Rao | 370/519 |
| 2002/0176356 A1 * | 11/2002 | Courtney et al. | 370/216 |
| 2004/0184487 A1 * | 9/2004 | Kim | 370/516 |
| 2004/0213268 A1 * | 10/2004 | Gupta et al. | 370/395.51 |
| 2005/0254522 A1 * | 11/2005 | Benvenuti et al. | 370/474 |

\* cited by examiner

*Primary Examiner* — Ricky Ngo
*Assistant Examiner* — Wei-Po Kao
(74) *Attorney, Agent, or Firm* — Wall & Tong, LLP

(57) ABSTRACT

A method and apparatus for processing member containers of a virtual concatenation group at a source side of a member container transmission network to compensate for differential delay between the member containers.

19 Claims, 5 Drawing Sheets

METHOD AND APPARATUS FOR FORWARD DELAY COMPENSATION FOR VIRTUAL CONCATENATION

FIELD OF THE INVENTION

The invention relates to the field of network routing and, more specifically, compensation for differential delay of packets routed within a network.

BACKGROUND OF THE INVENTION

In virtual concatenation of transport containers, a group of member containers is defined over which a data stream of higher bandwidth can be transported. This is done, for example, when transporting data over SONET/SDH networks. The virtual concatenation group member containers are transported as synchronous payload envelopes across the SONET/SDH network and recombined at the virtual concatenation group receiver. These virtual concatenation groups are further enriched by a link capacity adjustment scheme, which allows dynamic provisioning and reconfiguration of virtual concatenation groups, including dynamic changes in the bandwidth of virtual concatenation groups.

In order to keep track of the member container transmission order for a virtual concatenation group, each member container has associated with it a multi-frame identifier value. At the source side of a virtual concatenation link, all member containers are assigned the same multi-frame identifier value. Since each member container is routed over a network individually, each member container experiences its own specific amount of delay caused by differences in the physical transmission path length, intermediate equipment delay, and the like. These differences in transport delay must be compensated for in order to arrange the member containers of a virtual concatenation group in the correct order at the virtual concatenation group terminating equipment.

This differential delay compensation is typically done at the receiving side of the system by storing the member containers in a buffer memory as long as all of the members belonging to a specific virtual concatenation group have not yet been received. After the slowest member container is received, all members of that virtual concatenation group are then read from the buffer in the original order in which they were transmitted.

Using this process, the amount of differential delay that is compensated for at the virtual concatenation group receiving end, defined as the correction range of the receiving equipment, is limited by the size of the buffer in the virtual concatenation group receiving equipment. In practical networks, a situation may occur in which differential delay between some member containers of a virtual concatenation group is larger than the correction range of the receiving equipment to which the member containers are transmitted. This situation is exacerbated due to the dynamic nature of the differential delay of member containers as a result of changes in the path routing, changes to the bandwidth of the virtual concatenation group, and the like. When this condition exists, transmission using virtual concatenation fails since the virtual concatenation group member containers cannot be rearranged in the correct order at the receiving equipment.

In some cases, the source side and receive side of virtual concatenation groups are under the control of different network operators. This prevents the network operator with control of the source side from taking any measures (such as increasing the buffer size of the receiving equipment) to prevent the condition in which the differential delay of virtual concatenation group member containers is larger than the correction range of the receiving equipment. Furthermore, even for the case in which a network operator does have control over the receive side equipment of a virtual concatenation group, the receiving equipment may not be upgradeable.

SUMMARY OF THE INVENTION

The invention comprises a method and apparatus for processing member containers of a virtual concatenation group at a source side of a member container transmission network to compensate for differential delay between the member containers.

Specifically, a method according to one embodiment comprises the steps of determining, for each of a plurality of links between a source node and a destination node, a respective delay parameter, comparing the respective delay parameters to determine thereby a maximum differential delay and selectively imparting a transmission delay to at least one of the member containers, said transmission delay adapted to reduce the maximum differential delay below a threshold level.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The invention is discussed in the context of a SONET/SDH network architecture; however, the methodology of the invention can readily be applied to other network topologies in which differential path delay is present. The invention compensates for differential delay between member containers of a virtual concatenation group at the source side of a member container transmission group. The invention substantially reduces the dependency on the member container receiving equipment of compensating for differential delay between member containers of a virtual concatenation group.

Figure 1:
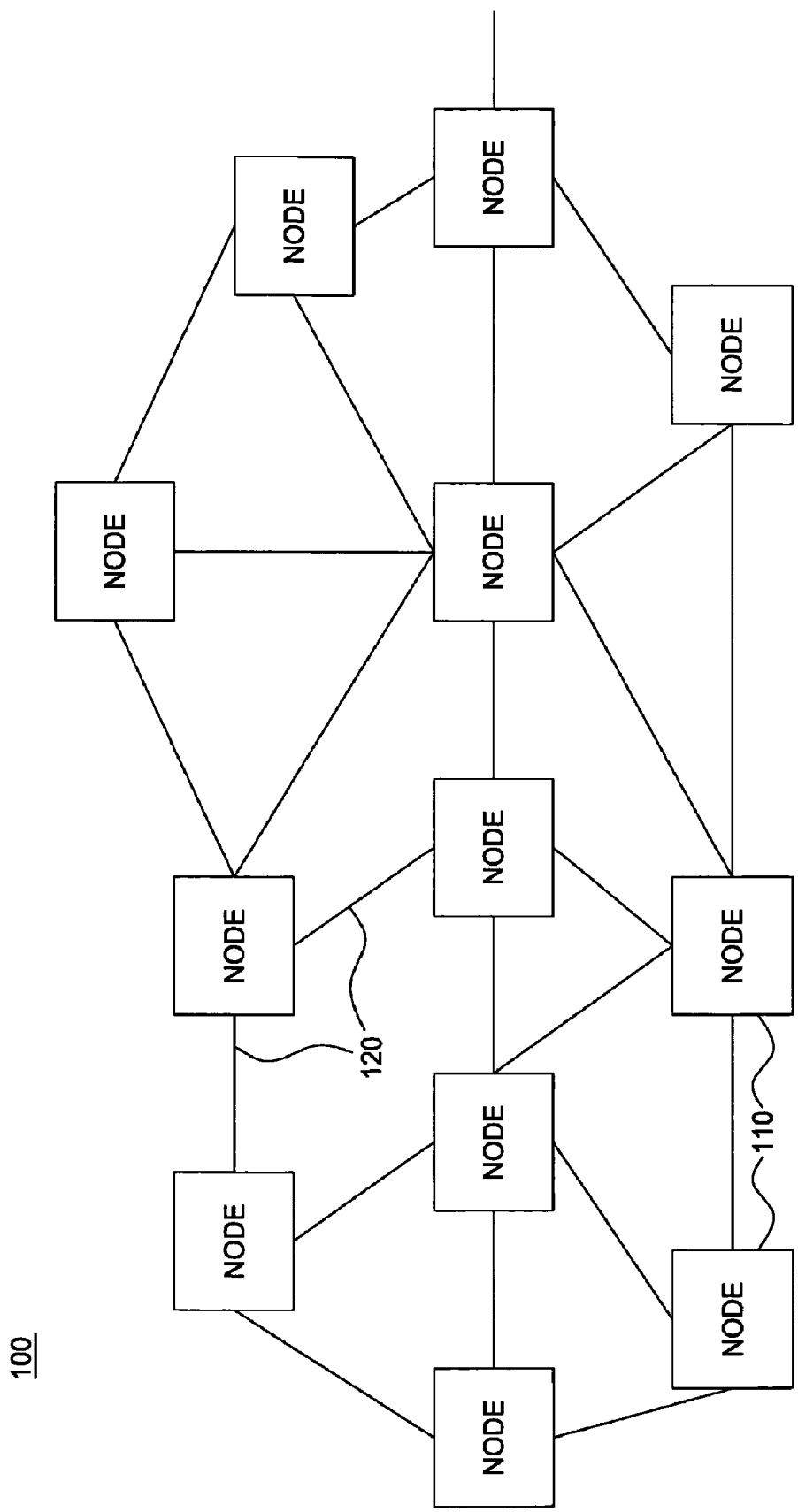
FIG. 1 depicts a high level block diagram of a communication network architecture.

FIG. 1 depicts a high level block diagram of a communication network architecture benefiting from the present invention. Specifically, communication network architecture 100 of FIG. 1 comprises a mesh network including a plurality of nodes 110 connected by a plurality of links 120. Any two nodes 110 depicted in FIG. 1 that are in communication with at least two links 120 are suitable for use as source and destination nodes of a path benefiting from the present invention.

Figure 2:
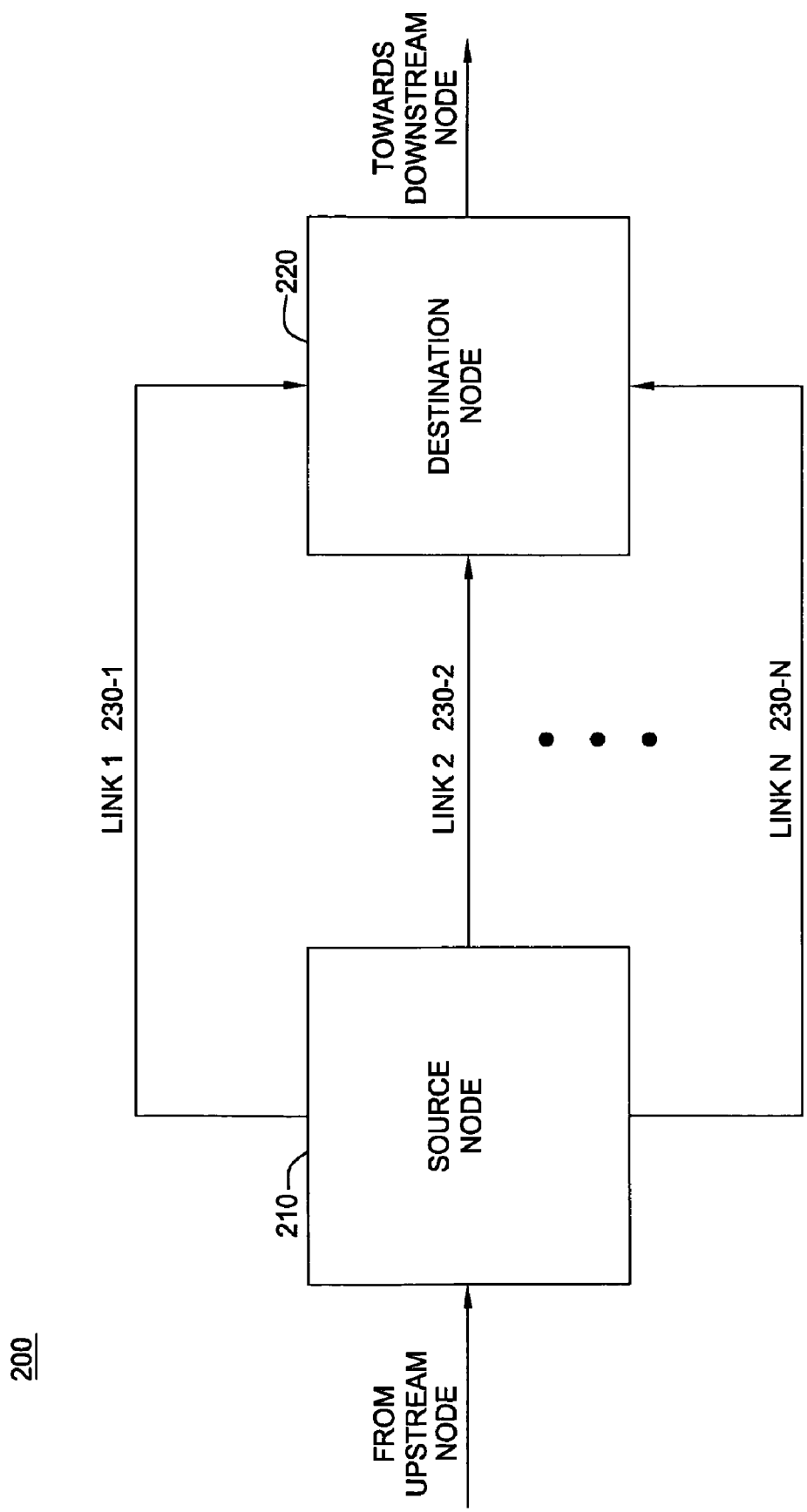
FIG. 2 depicts a high level block diagram of a portion of the communication network architecture of FIG. 1.

FIG. 2 depicts a source node and a destination node connected via a plurality of links, where the source node and destination node are any of a pair of nodes 110 depicted in FIG. 1 that are in communication via at least two links 120.

Specifically, the member container transmission network 200 of FIG. 2 comprises a source node 210, a destination node 220 and a plurality of links 230-1 through 230-N (collectively links 230) connecting the source node 210 to the destination node 220. Each of the links 230 has associated with it a respective delay parameter.

The source node 210 receives virtual concatenation group member containers from an upstream node and transmits said member containers to the destination node 220 via the links 230. In this embodiment, in which the source node 210 is not a source of the virtual concatenation link, the source node 210 operates as a destination node for the member containers received from an upstream node.

In turn, the destination node 220 receives the member containers from the source node 210 via the links 230 and transmits the member containers towards a downstream node. In this embodiment, in which a destination node 220 does not terminate the virtual concatenation link, the destination node 220 operates as a source node for the member containers transmitted towards a downstream node.

The establishment of the respective delay parameters of the links 230 is accomplished by at least one of a plurality of methods. In one embodiment, the respective delay parameters associated with the links 230 are determined by the source node 210 on-the-fly during member container processing. In another embodiment, the respective delay parameters associated with the links 230 are determined and stored in the source node 210 prior to use of the source node 210 to provide differential delay compensation. In this embodiment, the initially determined and stored respective delay parameters may be updated both periodically and on-the-fly during processing.

The calculation of the respective delay parameters is accomplished by at least one of a plurality of methods. In one embodiment, each of the respective delay parameters associated with the links 230 are determined as a function of the physical transmission path lengths of the links 230. In one such embodiment, each of the respective delay parameters associated with the links 230 are directly proportional to the physical transmission path length of each link.

Figure 3:
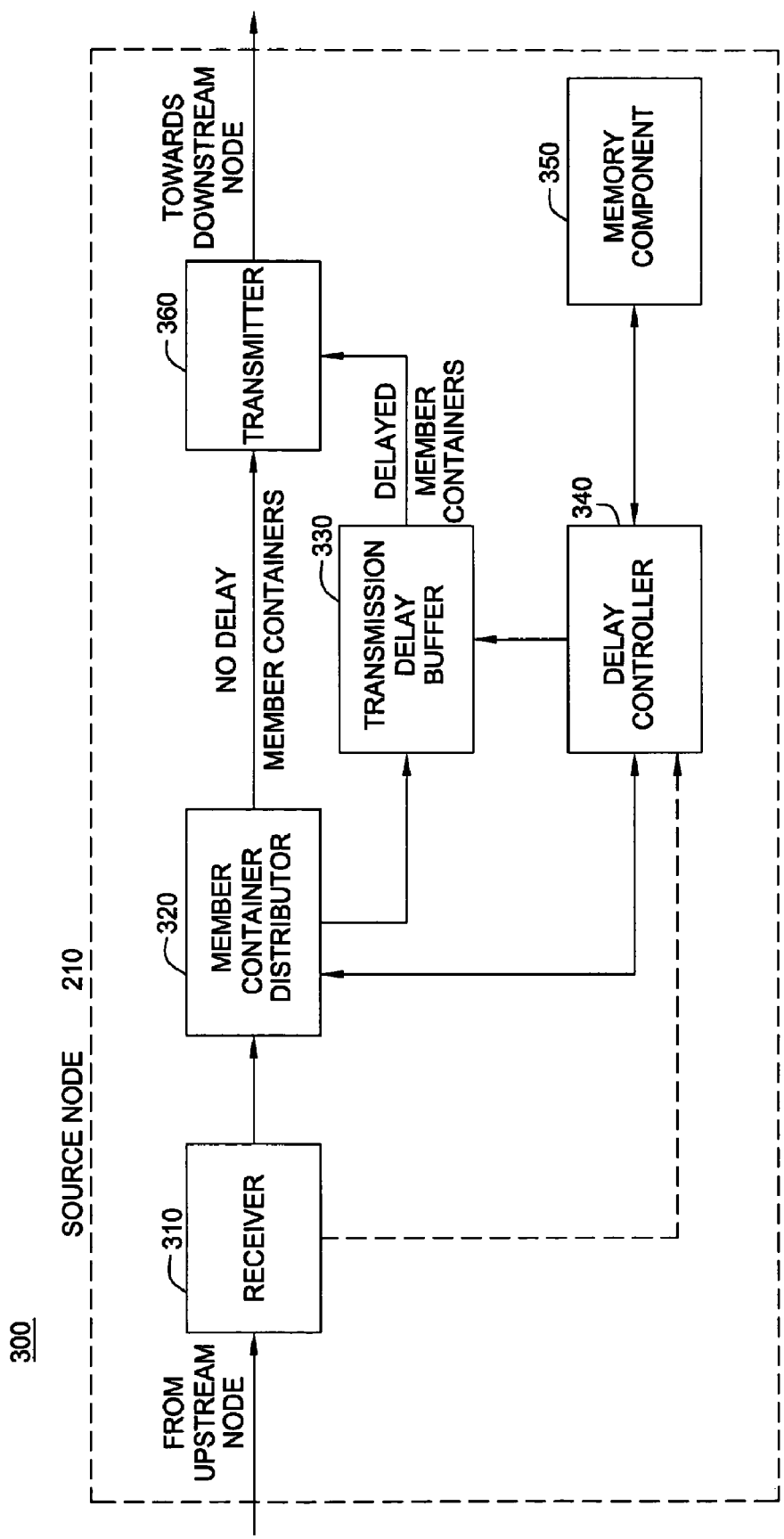
FIG. 3 depicts a high level block diagram of a source node suitable for imparting a transmission delay to a portion of the member containers of a virtual concatenation group.

FIG. 3 depicts a high level block diagram of an exemplary source node suitable for use as the source node 210 depicted above with respect to FIG. 2. Specifically, source node 210 of FIG. 3 comprises a receiver 310, a member container distributor 320, a transmission delay buffer 330, a delay controller 340, a memory component 350 and a transmitter 360.

The receiver 310 is any receiver suitable for supporting the functions described herein. The receiver 310 receives the member containers of a virtual concatenation group from an upstream node. The receiver 310 is coupled to the member container distributor 320 for the purposes of transmitting the received member containers to the member container distributor 320. The receiver 310 is optionally coupled to the delay controller 340 in order to provide member container routing information to the delay controller 340.

The member container distributor 320 is coupled to the receiver 310 for receiving member containers, and communicates with the delay controller 340 for the purposes of determining the appropriate distribution of the received member containers. The member container distributor 320 is coupled to the transmitter 360 for the purpose of routing a first portion of the member containers of a virtual concatenation group directly to the transmitter 360. The member container distributor is coupled to the transmission delay buffer 330 for the purpose of routing a second portion of the member containers of a virtual concatenation group to the transmission delay buffer 330 in order to impart a transmission delay to each member container in said second portion of member containers.

The delay controller 340 communicates with member container distributor 320 for the purpose of receiving member container routing information, and for providing information to the member container distributor 320 with respect to how to distribute each member container received by the receiver 310. As mentioned above, the delay controller 340 is optionally coupled to the receiver 310 for the purpose of receiving member container routing information.

The delay controller 340 is coupled to memory component 350 for retrieving information useful in determining whether a transmission delay is imparted to a member container. The delay controller 340 is coupled to the transmission delay buffer 330 for the purposes of controlling the transmission delay imparted to a member container.

As described above, the delay controller 340 receives member container routing information from at least one of the receiver 310 and the member container distributor 320 for each member container received by source node 210. The member container routing information includes the destination node 220 to which the member container is scheduled to be transmitted, and the link (chosen from the set of links 230) that the member container is scheduled to traverse in order to reach destination node 220.

The delay controller 340 uses this member container routing information to determine the links 230 that connect the source node 210 to the destination node 220, and the respective delay parameters associated with each of the links 230. In one embodiment, the delay controller 340 queries the memory component 350 using the destination node 220 as the search criteria. In response, the memory component 350 returns the links 230 associated with destination node 220, as well as the respective delay parameters associated with the links 230.

The delay controller 340 compares the respective delay parameters of one of the links 230 that the member container is scheduled to traverse, and the other links 230 that the member container is not scheduled to traverse, in order to determine a maximum differential delay. The delay controller 340 then compares the determined maximum differential delay to a threshold value, and based upon the result of that comparison, communicates information to the member container distributor 320 that is used by the member container distributor 320 to distribute that member container.

In one embodiment, the threshold value is a correction range value associated with the destination node 220 (or a subsequent destination node or chain of nodes in a multi-node path) to which that member container is scheduled to be transmitted. The correction range value is the amount of differential delay between member containers that can be compensated for by the destination node 220, such that any differential delay between member containers that is larger than the correction range will make transmission and reassembly of that virtual concatenation group impossible. In this embodiment, delay controller 340 retrieves the correction range value associated with destination node 220 from the memory component 350.

If the maximum differential delay is less than a threshold value, the delay controller 340 communicates at least one instruction to the member container distributor 320 to distribute that member container directly to the transmitter 360 as part of the first portion of member containers (described hereinabove). If the maximum differential delay is greater than a threshold value, the delay controller 340 determines if that member container is scheduled to traverse a faster link, wherein said faster link is defined as the link having a smaller respective delay parameter. The two links that are compared in making this determination are one of the links 230 that the member container is scheduled to traverse, and one of the links 230 that yielded the determined maximum differential delay.

If the member container is scheduled to traverse the slower link, no transmission delay is imparted to the member container, and the delay controller 340 communicates at least one instruction to the member container distributor 320 to distribute that member container directly to the transmitter 360. If the member container is scheduled to traverse the faster link, the delay controller 340 communicates at least one instruction to the member container distributor 320 to distribute that member container to the transmission delay buffer 330.

After determining that a transmission delay must be imparted to a member container, the delay controller 340 determines the transmission delay that will be imparted to the member container, and communicates that transmission delay to at least one of the member container distributor 320 and the transmission delay buffer 330. The transmission delay is determined as a function of the difference between the maximum differential delay associated with one of the links 230 that the member container is scheduled to traverse and the correction range value associated with the destination node 220.

The determination of the transmission delay to be imparted to a member container is accomplished by at least one of a plurality of methods. In one embodiment, the transmission delay to be imparted is determined as part of the processing of a member container. In another embodiment, the transmission delay to be imparted is determined in advance of the member containers being received by a source node 210. In this embodiment, the transmission delay values for the combinations of that source node 210 and the destination node 220 to which it is connected, as well as the associated links 230, are stored in the memory component 350. Thus, when a virtual concatenation group member container is received at the source node 210, the delay controller 340 queries the memory component 350 in order to determine the desired transmission delay to be imparted to that member container.

The communication of member container distribution instructions from the delay controller 340 to the member container distributor 320 is accomplished by at least one of a plurality of methods. In one embodiment, the delay controller 340 sends a signal which, when received and processed by member container distributor 320, communicates member container distribution instructions for distributing that member container. In this embodiment, the delay controller 340 communicates the transmission delay to be imparted to that member container to the transmission delay buffer 330.

In another embodiment, delay controller 340 uses the transmission delay as the means of communicating the member container distribution instruction to member container distributor 320. If the transmission delay is zero, the member container distributor 320 distributes that member container directly to transmitter 360. If the transmission delay is greater than zero, member container distributor 320 distributes that member container to transmission delay buffer 330 to impart that transmission delay to the member container, and the delay controller 340 communicates the transmission delay to transmission delay buffer 330. Although the above embodiment describes the use of the transmission delay value to communicate member container distribution information to the member container distributor 320, any suitable method of communicating such information may be employed.

The transmission delay buffer 330 is any buffer suitable for supporting the functions described herein. The transmission delay buffer 330 is coupled to the member container distributor 320 for the purpose of receiving member containers for which a transmission delay is to be imparted. The transmission delay buffer 330 is used to imparted transmission delay to at least a portion of the member containers. The transmission delay buffer 330 is coupled to the transmitter 360 for the purpose of forwarding delayed member containers for transmission towards a downstream node.

The transmission delay buffer 330 is coupled to the delay controller 340 for the purposes of receiving instructions from the delay controller 340 regarding the writing of member containers to the transmission delay buffer 330, imparting a transmission delay to the member container and reading the member container from the transmission delay buffer 330 after the transmission delay has been imparted.

The transmitter 360 is any transmitter suitable for supporting the functions described herein. The transmitter 360 is coupled to the member container distributor 320 for receiving said first portion of member containers for which no transmission delay is imparted. The transmitter 360 is coupled to transmission delay buffer 330 for receiving said second portion of member containers for which a transmission delay is imparted. The transmitter 360 transmits the member containers, both delayed and non-delayed, of a virtual concatenation group towards a downstream node.

Figure 4A:
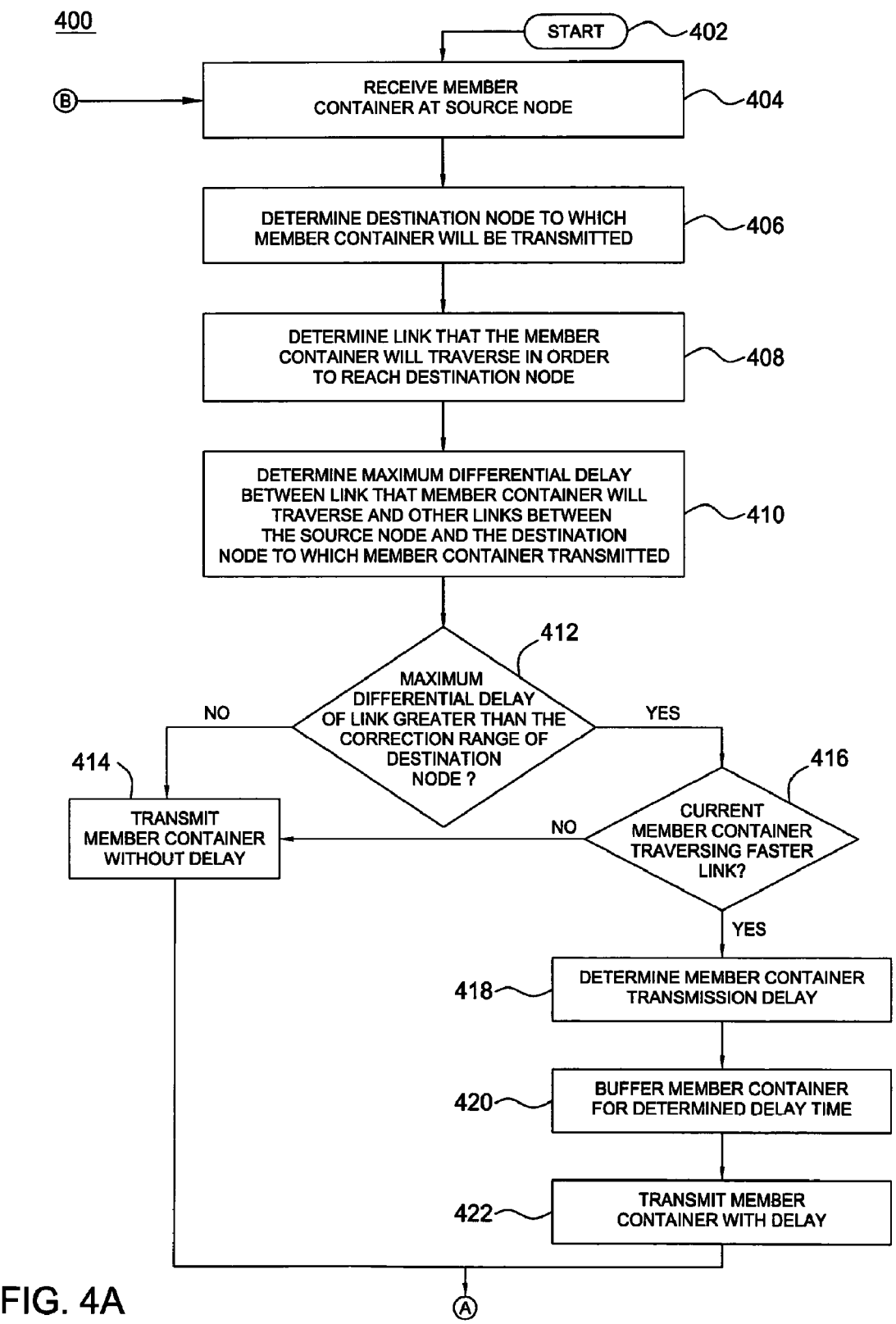
FIG. 4 depicts a flow diagram of a method according to the present invention.
Figure 4B:
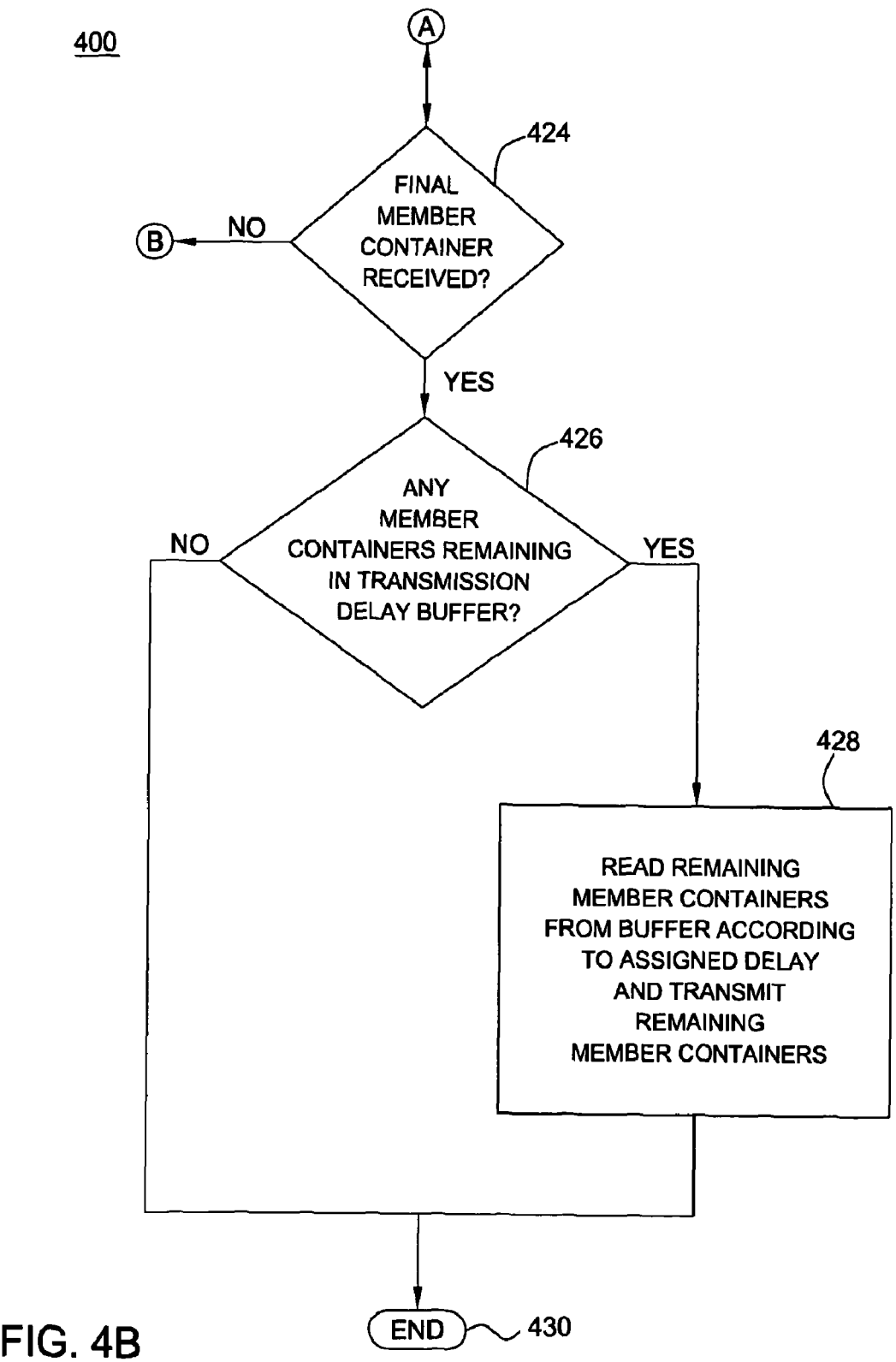

FIG. 4 depicts a flow diagram of a method according to the invention. Specifically, FIG. 4 depicts a flow diagram of a method 400 for processing the member containers of a virtual concatenation group, at the source side of a member container transmission network, in order to compensate for differential delay between the member containers.

The method 400 of FIG. 4 is entered at step 402 and proceeds to step 404 where the source node 210 receives a member container from an upstream node. As described hereinabove, the member container is received by receiver 310 of source node 210 and is passed to the member container distributor 320.

At step 406, the delay controller 340 determines the destination node 220 to which the member container is scheduled to be transmitted. The destination node 220 is determined from a portion of the header of the member container. In one embodiment, the destination node 220 to which the member container is scheduled to be transmitted is determined by receiver 310 and communicated to the delay controller 340. In another embodiment, the destination node 220 to which the member container is scheduled to be transmitted is determined by the member container distributor 320 and communicated to the delay controller 340.

In one embodiment, in which the threshold is a correction range of the destination node 220, the delay controller 340 determines the correction range value associated with that destination node 220. The correction range value is retrieved from memory component 350 using the destination node 220 as an input to the query.

At step 408, the delay controller 340 determines one of the links 230 that the member container is scheduled to traverse in order to reach the destination node 220. In one embodiment, this member container routing information is provided by the member container distributor 320 from the header of the member container. In another embodiment, this member container routing information is provided by the receiver 310 from the header of the member container. In still another embodiment, this member container routing information is retrieved by the delay controller 340 from at least one routing table in memory component 350.

At step 410, the delay controller 340 determines the maximum differential delay between one of the links 230 that the member container is scheduled to traverse (as determined in step 408) and the one or more other links 230 that the member container is not scheduled to traverse. The maximum differential delay is determined by first determining the set of differential delay values between one of the links 230 that the member contain is scheduled to traverse and the other links 230 that the member container is not scheduled to traverse. The differential delay values are then compared in order to determine the maximum differential delay associated with the link that the member container is scheduled to traverse.

At step 412, the delay controller 340 determines whether the maximum differential delay determined in step 410 is greater than a threshold value. For the purposes of this example, the threshold value, as described hereinabove, is a correction range of the destination node 220 to which the member container is scheduled to be transmitted; however, any suitable threshold value may be used.

If the maximum differential delay is less than the correction range of the destination node 220, no transmission delay is imparted to the member container and the method 400 proceeds to step 414. If the maximum differential delay is greater than the correction range of the destination node 220 the method 400 proceeds to step 416.

At step 414, the delay controller 340 communicates at least one instruction to the member container distributor 320 to distribute that member container directly to the transmitter 360 for transmission towards a downstream node. In one embodiment, the delay controller communicates the instruction to the member container distributor 320 by sending a transmission delay value of zero to the member container distributor 320; however, any suitable means of communicating that instruction can be employed. After the member container is transmitted, the method 400 proceeds to step 424.

If the maximum differential delay is greater than the correction range of the destination node 220, as determined at step 412, the method 400 proceeds to step 416. At step 416, the delay controller 340 determines if the member container is scheduled to traverse a faster link, wherein said faster link is defined as the link having a smaller respective delay parameter. The two links that are compared in making this determination are one of the links 230 that the member container is scheduled to traverse, and one of the links 230 that yielded the determined maximum differential delay during step 410.

If the member container is scheduled to traverse the slower link, no transmission delay is imparted to the member container, and the method 400 proceeds to step 414. As described hereinabove with respect to step 414, the member container is distributed directly to the transmitted 360 for transmission towards a downstream node. The method 400 then proceeds to step 424. If the member container is scheduled to traverse the faster link the method 400 proceeds to step 418.

At step 418, the delay controller 340 determines the transmission delay that is imparted to the member container. The transmission delay is determined as a function of the difference between the maximum differential delay associated with one of the links 230 that the member container is scheduled to traverse and the correction range value associated with the destination node 220.

In one embodiment, the transmission delay is determined as a sum of the difference between the maximum differential delay and the correction range value, and a delay factor. In this embodiment, the delay factor is selected such that, after a transmission delay has been imparted to a member container, the determined maximum differential delay associated with that member container is reduced to a value that is less than the correction range. The delay factor may be set to one of a plurality of values. The delay factor used in calculating the transmission delay may be a constant value, a percentage of the difference between the maximum differential delay and the correction range value, a percentage of the correction range value, and the like.

At step 420, the delay controller 340 communicates at least one instruction to the member container distributor 320 to distribute that member container to the transmission delay buffer 330 in order to impart the transmission delay determined at step 418. In one embodiment, the delay controller 340 communicates the instruction to the member container distributor by sending the transmission delay (which is greater than zero) to the member container distributor 320; however, any suitable means of communicating that instruction may be employed. After the member container is distributed to the transmission delay buffer 330, the method 400 proceeds to step 422.

At step 422, after the transmission delay has been imparted to the member container, the delay controller 340 communicates an instruction to the transmission delay buffer 330 to read the delayed member container from the transmission delay buffer 330 and to route that member container to the transmitter 360 for transmission towards a downstream node. Following the transmission of that member container the method 400 proceeds to step 424.

At step 424, at least one of the receiver 310, the member container distributor 320 and the delay controller 340 determines if the final member container in the virtual concatenation group has been received by the source node 210. If the final member container in the virtual concatenation group has not been received, the method 400 proceeds to step 404 where the next member container in the virtual concatenation group is received and processed according to the present invention, as described herein. If the final member container in the virtual concatenation group has been received, the method 400 proceeds to step 426.

At step 426, the delay controller 340 determines if there are any member containers of that virtual concatenation group remaining in the transmission delay buffer 330. If no member containers remain in the transmission delay buffer 330, the method 400 proceeds to step 432 where the method 400 ends. If at least one member container remains in the transmission delay buffer 330, the method 400 proceeds to step 428.

At step 428, the member containers remaining in transmission delay buffer 330 continue to be buffered according to the transmission delay determined in step 418 and imparted in step 420. As the imparting of the transmission delay is completed, the delay controller 340 communicates at least one instruction to the transmission delay buffer 330 to read the remaining delayed member containers from the transmission delay buffer 330. The remaining member containers are routed to the transmitter 360 for transmission towards a downstream node.

After the last member container of a virtual concatenation group has been read from transmission delay buffer 330 and transmitted towards a downstream node by the transmitter 360, the method 400 proceeds to step 430 where the method 400 ends.

The invention may also be utilized within the context of a multiple node communication path, wherein the path between a source node and a destination node has at least one intermediate or intervening node. The source, intermediate and destination nodes are in communication via a plurality of possible paths, supported by various combinations of inter-node links.

In one embodiment, the invention is adapted to impart a delay at the source node that is determined with respect to a worst case delay identified using each of the possible combinations of inter-node links. In another embodiment, the invention is utilized at one or more of the source and intermediate nodes to impart a compensation delay. In another embodiment, a statistical processing is performed to identify a likely worst case delay parameter, using at least one of an averaging technique, a historical comparison technique and the like.

Some or all of the inter-node links may be processed in this manner to determine a worst case delay for use in determining temporal compensation parameters. In one embodiment, a maximum differential delay is determined by averaging worst case delays associated with at least some of the inter-node links.

In another embodiment, a status bit may be used to signal a source node delay controller to provide an indication that member containers received by a destination node are 'out of delay range'. The status bit is transmitted by the destination node that detects the 'out of delay range' condition. The source side delay controller incrementally adjusts the member container delay until the destination node signals the source node to provide an indication that member containers received by the destination node are 'within delay range'. The status bit is transmitted by the destination node that detects the 'within delay range' condition. In one such embodiment, the status bit may be communicated from the destination node to the source node using Link Capacity Adjustment Scheme (LCAS) transmission overhead signaling.

The above-described invention, by implementing a transmission delay at the source side of a virtual concatenation group transmission network, increases the amount of differential delay that may be compensated for by receiving-end equipment. As such, larger differences in physical path length are supported during virtual concatenation by replacing/upgrading equipment at the source side only. This is especially beneficial when the correction range of the receiving side equipment is limited.

Furthermore, by introducing member container source side transmission delay compensation, in combination with the link capacity adjustment scheme protocol, the number of traffic interruptions experienced during reconfiguration of virtual concatenation groups (by adding and removing paths) is significantly reduced.

One skilled in the art will appreciate that all or part of systems and methods consistent with the present invention may be stored on or read from computer-readable media, such as secondary storage devices (e.g., hard disks, floppy disks, CD-ROM, DVD and the like); a carrier wave received from the Internet or other communications medium; or other forms of ROM or RAM. Finally, although specific components of data processing system have been described, one skilled in the art will appreciate that a data processing system suitable for use with the exemplary embodiment may contain additional or different components, such as multiple processors and a variety of input/output devices. Generally speaking, the systems and methods of the present invention may be practiced in various tangible and intangible media, various computer and data processing systems and the like.

Although various embodiments which incorporate the teachings of the present invention have been shown and described in detail herein, those skilled in the art can readily devise many other varied embodiments that still incorporate these teachings.

What is claimed is:

1. A method for processing member containers of a virtual concatenation group, comprising:
    determining, for each of a plurality of links between a source node and a destination node, a respective delay parameter;
    comparing said respective delay parameters to determine thereby a maximum differential delay between said source node and said destination node; and
    transmitting said member containers from said source node toward said destination node, wherein a transmission delay is selectively imparted by said source node to at least one of said member containers transmitted from said source node toward said destination node, wherein said transmission delay selectively imparted at said source node is adapted to reduce said maximum differential delay below a threshold level.

2. The method of claim 1, wherein said threshold level is a correction range value associated with said destination node, said transmission delay only being imparted where said maximum differential delay exceeds said correction range value.

3. The method of claim 1, wherein said respective delay parameter is proportional to a physical transmission path length.

4. The method of claim 1, wherein said transmission delay is a function of a difference between said maximum differential delay and said threshold level.

5. The method of claim 1, wherein said transmission delay is imparted using a buffer in said source node.

6. The method of claim 1, wherein a transmission path between said source and destination nodes traverses at least one intervening node;
    said maximum differential delay being determined using each of a plurality of inter-node link combinations.

7. The method of claim 6, wherein said maximum differential delay is determined by averaging worst case delays associated with at least some of said inter-node links.

8. A first node for processing member containers of a virtual concatenation group for transmission toward a second node, the first node comprising:
    a receiver for receiving a plurality of member containers;
    a member container distributor coupled to said receiver for receiving said plurality of member containers, and operable to distribute a first portion of said plurality of member containers and a second portion of said plurality of member containers;
    a transmission delay buffer coupled to said member container distributor for receiving said second portion of said plurality of member containers, wherein said transmission delay buffer is configured to impart a transmission delay to each member container in said second portion of said plurality of member containers;
    a delay controller in communication with said member container distributor for controlling distribution of said plurality of member containers, and coupled to said transmission delay buffer for controlling the operation of said transmission delay buffer, wherein said delay controller is configured to:
        determine a respective delay parameter for each of a plurality of links between the first node and the second node;
        compare said respective delay parameters to determine thereby a maximum differential delay between said first node and said second node; and
        determine a transmission delay to be imparted to at least one of said member containers at said first node to reduce said maximum differential delay; and a transmitter coupled to said member container distributor for transmitting said first portion of said plurality of member containers received from said member container distributor toward said second node, and coupled to said transmission delay buffer for transmitting said second portion of said plurality of member containers received from said transmission delay buffer toward said second node.

9. The apparatus of claim 8, wherein said delay controller is configured to communicate said transmission delay to said member container distributor.

10. The apparatus of claim 9, wherein said member container distributor is configured to distribute said first portion of said plurality of member containers and said second portion of said plurality of member containers based on said transmission delay.

11. The apparatus of claim 10, wherein said transmission delay is zero for said first portion of said plurality of member containers.

12. The apparatus of claim 11, wherein said member container distributor is configured to route said first portion of said plurality of member containers to said transmitter.

13. The apparatus of claim 10, wherein said transmission delay time is greater than zero for said second portion of said plurality of member containers.

14. The apparatus of claim 13, wherein said member container distributor is configured to route said second portion of said plurality of member containers to said transmission delay buffer.

15. The apparatus of claim 14, wherein said delay controller is configured to communicate said transmission delay to said transmission delay buffer, and said transmission delay buffer is configured to impart said transmission delay to said member container for which said transmission delay was determined.

16. The apparatus of claim 8, wherein said transmission delay is a function of a difference between said maximum differential delay and a threshold level.

17. The apparatus of claim 16, wherein said threshold level is a correction range value associated with said destination node.

18. A non-transitory computer readable storage medium storing a software program, that, when executed by a computer, causes the computer to perform a method for processing member containers of a virtual concatenation group, the method comprising:
   determining, for each of a plurality of links between a source node and a destination node, a respective delay parameter;
   comparing said respective delay parameters to determine thereby a maximum differential delay; and
   transmitting said member containers from said source node toward said destination node, wherein a transmission delay is selectively imparted by said source node to at least one of said member containers transmitted from said source node toward said destination node, wherein said transmission delay selectively imparted at said source node is adapted to reduce said maximum differential delay below a threshold level.

19. The non-transitory computer readable storage medium of claim 18, wherein said threshold level is a correction range value associated with said destination node, said transmission delay only being imparted where said maximum differential delay exceeds said correction range value.

\* \* \* \* \*